W. L. WESTON & W. C. MAYNARD.
Brake for Children's Carriage.

No. 216,546. Patented June 17, 1879.

Attest:
H. L. Perrine
A. M. Long

Wm. Le Roy Weston.
Wm. C. Maynard.
Inventors.
By H. T. Abbot
Atty.

UNITED STATES PATENT OFFICE.

WILLIAM LE ROY WESTON AND WILLIAM C. MAYNARD, OF NEW MILFORD, PENNSYLVANIA.

IMPROVEMENT IN BRAKES FOR CHILDREN'S CARRIAGES.

Specification forming part of Letters Patent No. 216,546, dated June 17, 1879; application filed March 12, 1879.

*To all whom it may concern:*

Be it known that we, WM. LE ROY WESTON and WM. C. MAYNARD, of New Milford, in the county of Susquehanna and State of Pennsylvania, have invented certain new and useful Improvements in Devices for Locking Vehicle-Wheels; and we do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1:
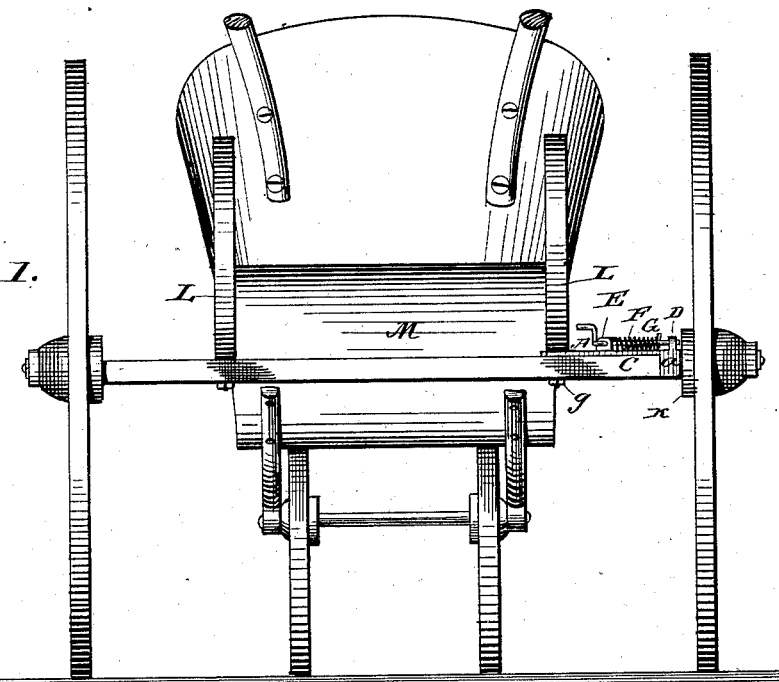
Figure 2:
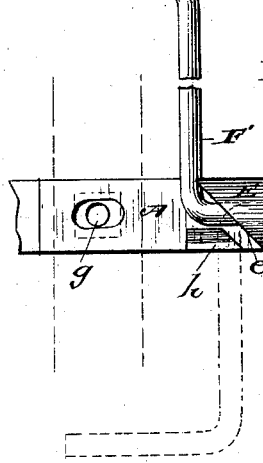
Figure 5:
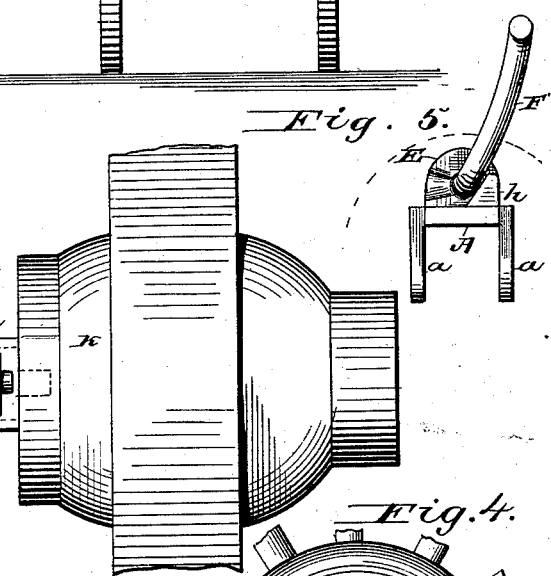
Figure 3:
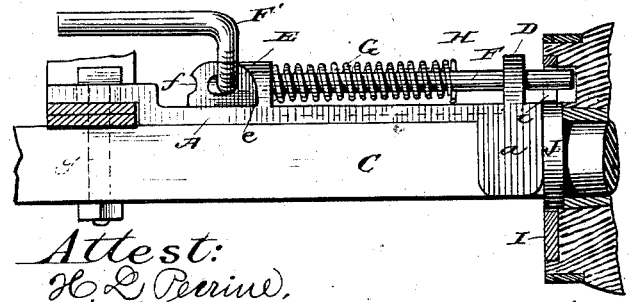
Figure 4:
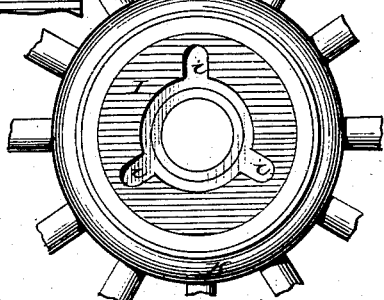

Figure 1 is a rear view of carriage with lock applied thereto; Fig. 2, a top view of axle with lock applied thereto in its position when the wheel is unlocked; Fig. 3, a rear view of axle, showing the position of the bolt when the wheel is locked; Fig. 4, a side view of the wheel-hub, showing the keeper applied thereto; and Fig. 5, an end view of the bolt, looking from the rear thereof.

Our invention relates to locking devices for checking the revolution of wagon or carriage wheels; and it consists in the construction and application of a bolt to the axle of the vehicle, whereby the movement of the vehicle is checked by means of a bolt entering the hub, or a plate or equivalent on the inner end thereof, and whereby the bolt-plate is rendered susceptible of a longitudinal adjustment, all substantially as and for the purpose hereinafter more particularly specified.

In the accompanying drawings, the letter A indicates the bolt-plate, cast or otherwise constructed with ears $a$, which fit over the sides of the axle C, and with lugs D and E, through which the bolt F is passed, the lug D steadying and directing one end of the bolt into its keeper, and the lug E being formed with a recess or notch, $f$, to assist in holding the bolt in position when drawn back from its keeper, and with an incline plane, $e$, which allows the bolt to slip forward into its keeper when so drawn by the spring G, which is coiled around the bolt between the lugs D and E, it bearing against the lug E, and being secured to the other end by a pin, H, passed through the bolt. The bolt is formed at one end into a crank-lever, F', and is prevented from falling beyond the reach of the foot by a check-block, $h$, formed on the bolt-plate just opposite the incline $e$. The bolt-plate is secured to the axle by means of a bolt, $g$, which also secures the spring L, on which the vehicle-body M rests, to the axle.

The hole formed in the bolt-plate for the passage of the bolt which secures the plate to the axle may be elongated instead of circular, so that the plate may be moved to or from the wheel-hub, thereby adjusting the plate to old or new carriages with different lengths or spaces between the springs and hubs.

That portion of the hub next to the lock is channeled or recessed, and over it is bolted or otherwise fitted a plate, I, having openings or notches $i$ formed therein for the passage of the bolt therethrough to lock the wheel and prevent it from turning. These notches or openings need not be elongated, but are preferably made so, in order to compensate for the wabbling of the wheel occasioned by wear, and thereby to insure the entrance therein of the bolt.

The collar J for the axle C is represented as made a part of the lock or bolt plate; but, instead, it may be made on the axle-tree, in the usual way.

The lock constructed as described may be secured to the upper or lower face of the axle-tree, and there may be one or more of them applied to the axle-tree, so that one or more of the wheels may be locked.

In practice the normal position of the bolt is that shown in Figs. 1 and 2.

When it is desired to check the movement of the vehicle, the bolt is turned to one side by an application of the foot to the crank-lever portion of the bolt, or otherwise. The bolt is drawn forward by the expansion of the coiled spring G, and is thrust through one of the openings in the plate I when in the revolution of the wheel the hole comes opposite to the end of the bolt, and thereby checks the turning of the wheel and stops the vehicle.

This lock is applicable to both children's carriages and to light wagons. It is cheap in construction and effective in operation.

Having described our invention, what we claim is—

1. The within-described bolt, consisting of the bed-plate A, formed with lugs D and E, constructed substantially as described, and combined with bolt F and a spring, G, for operating the same, substantially as set forth.

2. The bed-plate A, provided with lugs D and E, constructed substantially as described, and with an elongated hole therein, for the purpose set forth, combined with bolt F and spring G, substantially as described.

In testimony that we claim the foregoing as our own we affix our signatures in presence of two witnesses.

WILLIAM L. WESTON.
   WILLIAM C. MAYNARD.

Witnesses:
 A. W. STILES,
 F. Y. CORBIN.